United States Patent Office 3,175,566
Patented Mar. 30, 1965

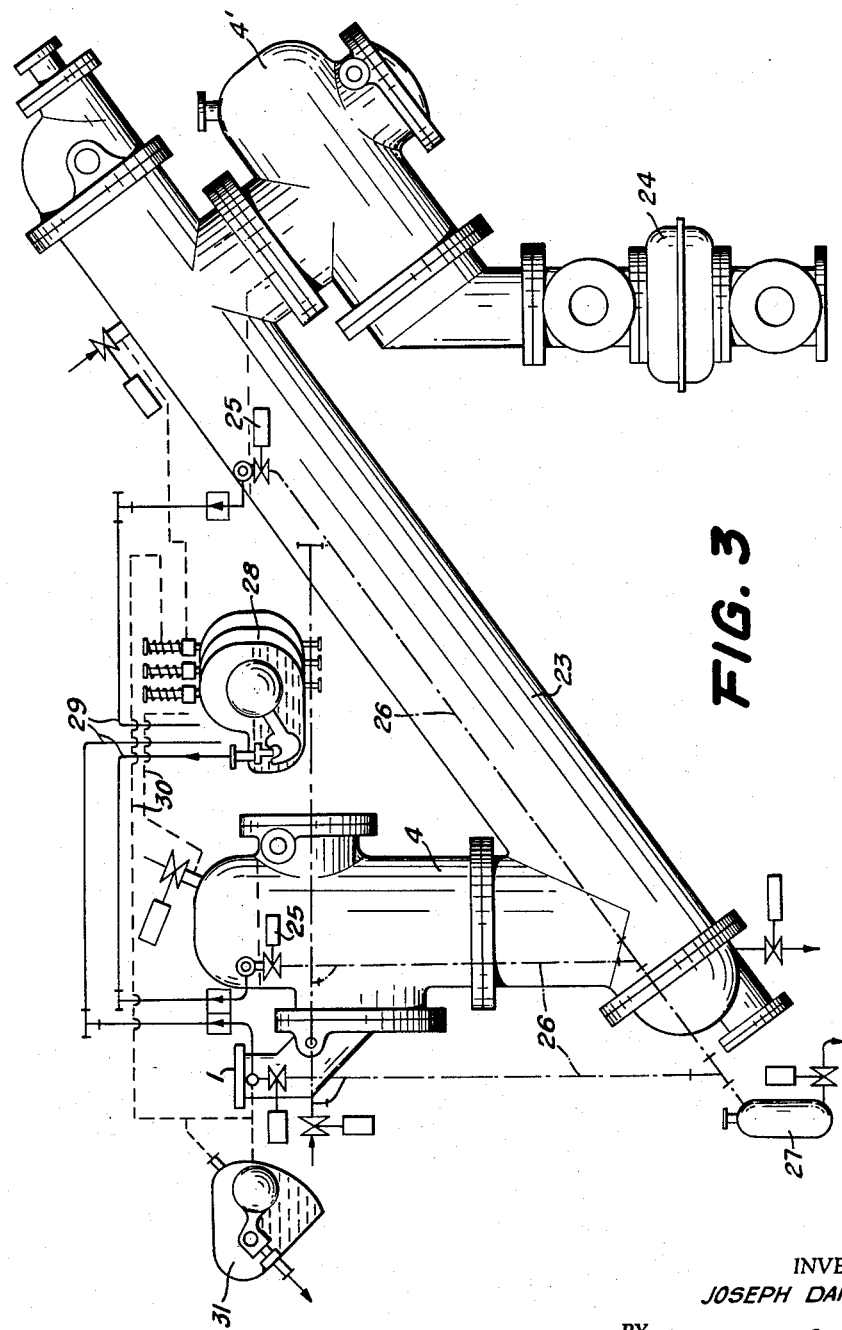

3,175,566
APPARATUS FOR REMOVAL BY MEANS OF SLUICES OF THE GASIFICATION RESIDUES FROM SPACES PREVAILING UNDER INCREASED PRESSURE
Joseph Daniels, Essen, Germany, assignor, by mesne assignments, to Koppers Company, Inc., Pittsburgh, Pa., a corporation of Delaware
Filed Sept. 5, 1963, Ser. No. 306,866
4 Claims. (Cl. 134—166)

The present invention relates to an apparatus for removal by means of sluices of the gasification residues from spaces prevailing under increased pressure and serving particularly for the gasification of finely divided fuels in suspension in oxygen or oxygen-enriched air.

One of the main difficulties in such apparatus lies in providing a reliable seal of the sluice spaces against an operating pressure which may amount to 30 atmospheres and higher.

In the case of the apparatus conforming to the present invention applicant proceeded from the concept that it is necessary to avoid any friction on the sealing surfaces by polished metallic or other closing devices and to effect the actual closing procedure on the sealing places in a hydraulic manner with special consideration of a reliable washing process for maintaining the sealing surfaces clean.

According to the invention, the sluice spaces are filled with water under pressure and are provided with annular chambers installed in the walls of flanges; and the seatings or bearing surfaces of the annular chambers have wide dove-tailed, hard rubber sealing rings. Two valve-like sealing plates press on each ring. These plates are operated mechanically or hydraulically by means of a knee lever and are mutually spaced by strong intermediate springs. Water under pressure strikes the intermediate space between the sealing plates by means of ducts located between the annular seatings of both plates and leading to the pressure space of the annular chambers. The water under pressure is supplied by means of a pump to the annular chambers under a pressure which is higher than the pressure of the charge of water in the sluice spaces.

According to another characteristic of the invention, the closing and opening procedures for the double plates are controlled cyclically in such a way that, shortly before loosening or closing of the plates by change of the dead center position of the knee lever mechanism, the tension is released from the sealing surfaces for a very brief time for the purpose of free washing of detrimental deposits from the seatings by means of the water under higher pressure from the annular chamber system, while the supply of water of higher pressure to the annular chambers remains automatically shut off when the plates are opened.

Water under pressure from the annular chamber also strikes the back of the seal by means of additional branch lines which lead from the connecting ducts between annular chamber and intermediate space between the sealing plates behind the hard rubber annular seal. This water under pressure counteracts the pressing pressure of the plates in the dead center position of the knee lever as well as the hydraulic pressure of the outer seating of the hard rubber ring in the vicinity of the intermediate space between the two closing plates.

The maximum closing force which is exerted by the knee lever mechanism on the sealing surfaces of the plates should be higher than the sum of all hydraulic individual pressures or differential pressures on the inner and outer sealing surfaces of the plates and on the back sealing surfaces of the hard rubber ring.

Two or more of the above described sluice spaces are naturally required for removal of the gasification residues from a continuously operating gasifier. There are numerous possibilities of arrangements of the sluice spaces. The invention makes a provision that the water levels of the charges of water under pressure inside several sluice spaces are maintained constantly at the same height as the water level of the water seal underneath the slag discharge by a high pressure steam trap and slide valve system. For this purpose the upper parts of the first and last hydraulic sluice spaces and all intermediate spaces are at the same height and are provided with connections to sources of compressed nitrogen for maintenance of the required operating pressure.

In a preferred arrangement of sluice spaces wherein only two sluice spaces are used, the invention contemplates providing a cylindrical pressure-resistant connecting space beginning in the lower end of the first sluice space, connecting both spaces and leading inclinedly towards the top, and extending to the height of the upper part of the second sluice space; and installing inside the connecting space a cyclically operated discharge means, preferably a scraper conveyor.

Additional details of the apparatus conforming to the invention as well as their operating methods are explained with reference to the accompanying drawings in which:

FIGURE 1 is a vertical section through a sluice space;
FIGURE 2 shows the construction of the seal in detail; and
FIGURE 3 illustrates the general arrangement of a sluice system.

Referring to FIG. 1, the water-cooled shaft 1 is located underneath the slag tap-hole (not illustrated) of the gasifier and has an inside cross-section of only about 0.16 square meter. Water level 2 is located in this shaft at a distance of about 1 meter from the slag discharge. The slag drops into the water where it is granulated, and the granules pass through to other discharge spaces. The amounts of steam produced by the specific heat of the slag dropping into the water are exhausted from the space above the water bath through a lateral discharge opening (not illustrated); slight traces of hot product gas are conveyed backward through the slag opening. Such slight gas losses are completely insignificant.

The downwardly inclined lower part of shaft 1 is connected with water-filled sluice space 4 by means of flange connection 3. The seal between shaft 1 and sluice space 4 is effected by the two sealing plates 5 and 6 which are spaced by a strong intermediate spring 7 and are pressed by means of mechanically or hydraulically operated knee lever mechanism 8 against the sealing surface 9, the design of which will be described in more detail. The lower opening 10 of shaft 1 has on its periphery an annular hydraulic chamber 11 in which some water under pressure is continuously pumped through opening 12. The pressure of this water is higher than that of the operating pressure inside the sluice space 4. This water under pressure goes through several ducts 13 uniformly distributed on the periphery into intermediate space 14 between the two sealing plates 5 and 6, whereby the inner plate 5 also receives the desired pressing pressure. In the lower inclined part of shaft 1 there is provided a valve 15 which is cyclically controlled and which prevents particles of slag from lodging between the sealing surfaces during the closing of the sealing plates. Finally, the upper part of sluice space 4 has a connection 16 for compressed nitrogen, by means of which the sluice space 4 is placed under operating pressure.

In FIG. 2, the two sealing plates are again indicated by 5 and 6, the intermediate space between them by 14, and the annular chamber by 11. In wall 17 there is inserted a dove-tailed hard rubber annular seal 18 on which are supported the sharp edges 19 and 20 of the two superimposed plates 5 and 6, which in turn are mechanically pressed by means of the above mentioned knee lever system, for example, by a hydraulically regulated cylinder. The inner plate 5 receives its preliminary bearing pressure by the springs 7 illustrated in FIG. 1. The water under pressure leaves the annular chamber 11 through duct 13 and rubber seal 18 and goes into the intermediate space 14 between the two plates 5 and 6. Naturally, this water under pressure also goes through branch lines 21 and presses against the back 22 of the rubber seal and produces there a pressure $b_2$ and $b_6$ opposite a pressure $b_1$ and $b_5$ on the hydraulic side of the sluice space maintained at a somewhat lower pressure.

Since the outer plate 6 presses on sealing surface 9 with a very high pressure P by means of knee lever 8 and with cooperation of the specific outer hydraulic surface force $p_4$, the inner plate 5 is forced against sealing surface 9 with the same desired high pressing pressure by the inner pressure $p_2$ which acts against the outer surface of the inner plate 5, since the pressure forces $p_1$ acting against the inner surface of this inner plate 5 are lower than the rather high hydraulic pressures $p_2$ and $p_3$ transmitted from the annular chamber 11 to the intermediate space 14.

However, an absolutely assured bearing pressure directed against the sealing edges 19 and 20 of the plates occurs as a result of the impact of pressures $b_2$ and $b_6$ on the back 22 of the hard rubber seal 18. Pressures $b_2$ and $b_6$ counteract the smaller pressures $b_1$ and $b_5$ acting on the bearing surface.

The dependability in operation of the closing procedure itself and particularly of the preliminary washing of the sealing surface 9 is obtained by suitable control equipment. As long as the main pressing force P is smaller than the maximum exertable knee-lever force, no pressures in the order of magnitude of the pressure in the annular chamber 11 act on the bearing edges of the sealing plates 5 and 6 and the rubber seal 18, and the water under pressure which is introduced shortly before the final closing phases, explained hereinafter, flushes and effectively washes the sealing surface 9 at a pressure which is higher than the operating pressure and passes through the slits between the sealing edges 19, 20, and the sealing surface 9, into the water-filled spaces in front of and behind the sealing plates 5 and 6. It acts the same in the case of a pervious seating at any small intermediate place. In this way water under high pressure always flows into the sluice spaces.

The water under pressure which is continuously supplied to the sluice spaces serves simultaneously as replacement for the water which is vaporized and lost by addition of the hot slag. For maintaining a suitable level of water under pressure in the sluice spaces, any excess water is removed by a high-pressure steam trap and slide-valve system, the float of which is on the water level, as will be described in more detail.

FIG. 3 illustrates an example of a possible assembly of such designed and operated sluice spaces. Only one example is cited here from the numerous possible combinations of such means, the operating method of which is the same in principle.

In the present example an additional inclined sluice means 23 is placed on the lower edge of the first sluice space 4, the sealing plates of which hydraulically close the upwardly inclined slag shaft 1 underneath the slag tap hole. Sluice means 23 houses on the inside a discharge device, preferably a scraper conveyor, and is equipped on its upper end with a sluice space 4' provided with sealing plates. The scraped material falls through sluice space 4' into a final sluice space 24.

With this arrangement, the sealing plates in the first sluice space 4 are normally opened and those in the sluice space 4' are closed. If a sufficient amount of slag has accumulated in the lower part of sluice means 23, the sealing plates in space 4 are closed, the pressure is released in space 4'—without change of the uppermost water level—and the conveyor belt is placed in operation until the final sluice space 24 is filled. The sealing plates in sluice space 4' are then closed, nitrogen is injected onto the surface of the water, and the sealing plates in space 4 are opened. It is now possible to empty final sluice space 24 with its water content. The latter should naturally again be replaced before the next sluicing period, while sluice spaces 4 and 4' remain always filled with water. However, the final sluice space 24 can also be operated without filling with water.

The described apparatus operates with very low losses of water from the water seals, since the sealing plates of the sluice space 4 are closed before the release of nitrogen pressure from the surface of water in space 4 and in sluice means 23, and the sealing plates in sluice space 4' are opened.

This regulating operation is a function of an automatic control. The latter also effects an automatic washing of the water discharge pipes at the top of the three water levels by means of control slide valve 25 provided below the water discharge pipes and piping system 26 (illustrated in broken lines) leading to settling tank 27.

A high pressure steam trap and slide-valve system 28 maintains a minimum height of the three water levels. The feed pipe system 29 necessary for this is indicated in solid lines.

Compressed nitrogen is injected on the surface of the water through connecting lines 30 (indicated in dotted lines) leading to the nitrogen nozzles of the various pressure spaces. Because of the constant fluctuation in the pressure conditions of the gasifier, moreover, a safety device 31 for the maximum height of the water level is also necessary. The small water level in slag shaft 1 is selected as indicating place for this.

I claim:

1. Apparatus for removing from the gasification chamber the solid residues in the gasification of finely divided fuels in suspension in a gas containing oxygen comprising:
    (a) a sluice space adapted to hold water under pressure;
    (b) a water cooled shaft adapted to be connected to said chamber and adapted to hold water under pressure;
    (c) a hollow flange constituting an annular chamber surrounding and fixed to said shaft at a terminus thereof, said hollow flange connecting said shaft to said sluice space so that fluid communication exists between said shaft and said sluice space;
    (d) a hard rubber sealing ring joined to said flange;
    (e) a pair of spaced coaxial sealing plates adapted for engagement with said sealing ring to provide a pair of annular seatings;
    (f) a spring for maintaining said plates in spaced position;
    (g) a knee lever for engaging and disengaging said plates with said ring;
    (h) ducts in said flange positioned between the annular seatings of said plates and leading to said annular chamber; and
    (i) means for supplying to said annular chamber water which is under a pressure higher than the pressure of the water in said sluice space.

2. The apparatus of claim 1 including means for controlling the opening and closing of said sealing plates so that the pressure is released from the sealing surfaces for a period of time prior to the opening or closing of said plates by change of the dead-center position of the knee lever mechanism to wash the seatings free of solids by the water from a pressurized source and for shutting off the supply of water to the annular chamber when the plates are opened.

3. The apparatus of claim 1 including a dovetailed joint for joining the hard rubber sealing surface and the flange and ducts for supplying the water under pressure from the annular chamber to the back of the annular seal whereby the water under pressure counteracts the pressure of the plates when the knee lever is in dead-center position and the hydraulic pressure of the outer seating of the hard rubber ring in the vicinity of the intermediate space between the pair of plates.

4. The apparatus of claim 1 including means for maintaining the water in the sluice space and the shaft at the same level, said means including a high pressure steam trap and slide valve system, and means for introducing nitrogen under pressure to maintain an operating pressure on the water.

References Cited by the Examiner
UNITED STATES PATENTS

| | | | |
|---|---|---|---|
| 845,244 | 2/07 | Lorenz | 137—246 |
| 1,873,405 | 8/32 | Hodgkins | 251—280 X |
| 2,004,266 | 6/35 | Beimann | 137—246 |

CHARLES A. WILLMUTH, *Primary Examiner.*

J. G. NORTH, *Examiner.*